(12) United States Patent
Tang et al.

(10) Patent No.: US 12,266,790 B2
(45) Date of Patent: Apr. 1, 2025

(54) ANODE, AND ELECTROCHEMICAL DEVICE COMPRISING THE SAME

(71) Applicant: Ningde Amperex Technology Limited, Ningde (CN)

(72) Inventors: Jia Tang, Fujian (CN); Pengyang Feng, Fujian (CN); Jiali Dong, Fujian (CN); Yuansen Xie, Fujian (CN)

(73) Assignee: Ningde Amperex Technology Limited, Ningde (CN)

( * ) Notice: Subject to any disclaimer, the term of this patent is extended or adjusted under 35 U.S.C. 154(b) by 0 days.

(21) Appl. No.: 18/649,030

(22) Filed: Apr. 29, 2024

(65) Prior Publication Data
US 2024/0290959 A1    Aug. 29, 2024

Related U.S. Application Data

(63) Continuation of application No. 17/265,871, filed as application No. PCT/CN2020/070076 on Jan. 2, 2020, now Pat. No. 12,015,145.

(51) Int. Cl.
| | |
|---|---|
| *H01M 4/36* | (2006.01) |
| *H01M 4/133* | (2010.01) |
| *H01M 4/1393* | (2010.01) |
| *H01M 4/525* | (2010.01) |
| *H01M 4/62* | (2006.01) |
| *H01M 4/02* | (2006.01) |

(52) U.S. Cl.
CPC .......... *H01M 4/366* (2013.01); *H01M 4/133* (2013.01); *H01M 4/1393* (2013.01); *H01M 4/525* (2013.01); *H01M 4/623* (2013.01); *H01M 2004/021* (2013.01); *H01M 2004/027* (2013.01); *H01M 2004/028* (2013.01)

(58) Field of Classification Search
CPC .......... H01M 4/366; H01M 2004/021; H01M 2004/027
USPC ........................................ 429/209
See application file for complete search history.

(56) References Cited

U.S. PATENT DOCUMENTS

| | | |
|---|---|---|
| 11,211,599 B2 | 12/2021 | Yura et al. |
| 2013/0260217 A1 | 10/2013 | Matsui et al. |

(Continued)

FOREIGN PATENT DOCUMENTS

| | | |
|---|---|---|
| CN | 1983681 A | 6/2007 |
| CN | 101682024 A | 3/2010 |

(Continued)

OTHER PUBLICATIONS

Indian Office Action issued Jan. 3, 2024, in corresponding Indian Patent Application No. 202117015827, 2 pp.

(Continued)

*Primary Examiner* — James M Erwin
(74) *Attorney, Agent, or Firm* — XSENSUS LLP

(57) ABSTRACT

An anode including a current collector and an anode active material layer disposed on the current collector are provided. The anode active material layer includes first oriented particles having a first tilt angle $\theta_1$ inclined with respect to the direction parallel to the current collector, and second oriented particles having a second tilt angle $\theta_2$ inclined with respect to the direction parallel to the current collector. The first tilt angle $\theta_1$ and the second tilt angle $\theta_2$ are different and both not greater than 70°.

20 Claims, 3 Drawing Sheets

(56) References Cited

U.S. PATENT DOCUMENTS

| | | |
|---|---|---|
| 2014/0170478 A1 | 6/2014 | Liao et al. |
| 2014/0170487 A1 | 6/2014 | Takahata et al. |
| 2016/0285100 A1 | 9/2016 | Tanizaki et al. |
| 2018/0159118 A1 | 6/2018 | Lee et al. |
| 2020/0185719 A1* | 6/2020 | Piao .................. H01G 11/42 |
| 2022/0209217 A1 | 6/2022 | Lee et al. |

FOREIGN PATENT DOCUMENTS

| | | |
|---|---|---|
| CN | 101779312 A | 7/2010 |
| CN | 103022416 A | 4/2013 |
| CN | 103078141 A | 5/2013 |
| CN | 204885268 U | 12/2015 |
| CN | 105794022 A | 7/2016 |
| CN | 108807849 A | 11/2018 |
| CN | 105900269 B | 3/2019 |
| CN | 109449373 A | 3/2019 |
| EP | 1953850 A1 | 8/2008 |
| JP | 2005-196970 A | 7/2005 |
| JP | 2007-194076 A | 8/2007 |
| JP | 2013-069429 A | 4/2013 |
| JP | 2013-089574 A | 5/2013 |
| JP | 2014-116209 A | 6/2014 |
| JP | 2014-137879 A | 7/2014 |
| JP | 2015-138644 A | 7/2015 |
| JP | 2016-091632 A | 5/2016 |
| JP | 2017-188473 A | 10/2017 |
| JP | 2019-096596 A | 6/2019 |
| JP | 2019-145529 A | 8/2019 |
| JP | 2019-175712 A | 10/2019 |
| WO | 2013/018180 A1 | 2/2013 |
| WO | 2013/088540 A1 | 6/2013 |
| WO | 2018/083917 A1 | 5/2018 |
| WO | 2019/186829 A1 | 3/2019 |

OTHER PUBLICATIONS

Japanese Notice of Allowance mailed Mar. 28, 2023, in counterpart Japanese application JP2021-512527, 3 pages in Japanese.
Japanese Second Office Action mailed Sep. 20, 2022, in counterpart Japanese application JP2021-512527, 4 pages in Japanese.
Japanese Office Action mailed Apr. 5, 2022, in counterpart Japanese application JP2021-512527, 8 pages in Japanese.
Extended European Search Report mailed Nov. 10, 2021, in counterpart European application EP20866949.9, 7 pages in English.
Chinese Notice of Allowance and Search Report mailed Dec. 21, 2020, in counterpart application CN202010000894X, 3 pages in Chinese.
PCT International Search Report mailed Sep. 28, 2020 in counterpart PCT application PCT/2020/070076, 5 pages in Chinese.
Chinese Search Report mailed Oct. 20, 2020, in counterpart application CN202010000894X, 2 pages in Chinese.

* cited by examiner

US 12,266,790 B2

ANODE, AND ELECTROCHEMICAL DEVICE COMPRISING THE SAME

CROSS-REFERENCE TO RELATED APPLICATIONS

The present application is a continuation application of U.S. application Ser. No. 17/265,871 filed on 4 Feb. 2021, which is a national stage application of PCT international application No. PCT/CN2020/070076 filed on 2 Jan. 2020, the disclosures of each are hereby incorporated by reference in their entireties.

BACKGROUND

1. Technical Field

The present application relates to the art of energy storage, and particularly to an anode and an electrochemical device including the same.

2. Description of the Related Art

As a new type of high-energy green batteries, lithium ion batteries are widely used in notebook computers, mobile phones, and new energy electric vehicles. This raises higher requirements for energy density, cycle life, cost, and safety of lithium ion batteries.

Increasing the compacted density of an anode is a good way to increase the energy density of lithium ion batteries, but a too high compacted density may cause the anode particles to break up, and result in an uneven formation of the solid electrolyte interface (SEI) film, and may risk deteriorated cycle performance. In addition, excessive compacted density will also lead to poor infiltration of the electrolyte, increased surface resistance, and the risk of lithium precipitation and battery deformation. The anode active material in prior art is susceptible to deformation and expansion after being subjected to roll and cycles of charge and discharge.

SUMMARY

To solve the above technical problems, the present application provides an anode, which includes an anode active material layer and a current collector, wherein the anode active material layer includes first oriented particles having a first tilt angle $\theta_1$ inclined with respect to the direction parallel to the current collector, and second oriented particles having a second tilt angle $\theta_2$ inclined with respect to the direction parallel to the current collector, wherein the first tilt angle $\theta_1$ and the second tilt angle $\theta_2$ are different and both not greater than 70°.

In some embodiments, the first oriented particles have a first tilt angle $\theta_1$ meeting: $0° \leq \theta_1 \leq 20°$.

In some embodiments, an area of the first oriented particles is 9%-23% of a cross sectional area of the anode active material layer.

In some embodiments, in the first oriented particles, particles having a particle size less than 10 μm account for 71.0%-93.0% and particles having a particle size between 10 μm and 35 μm account for 7.0%-29.0%.

In some embodiments, the second tilt angle $\theta_2$ of the second oriented particles in the anode meets $20° < \theta_2 \leq 70°$. The second oriented particles have an area ratio in the cross sectional area of the anode active material layer higher than that of the first oriented particles.

In some embodiments, an area of the second oriented particles is 37%-55% of a cross sectional area of the anode active material layer.

In some embodiments, in the second oriented particles, particles having a particle size between 10 μm and 35 μm account for 22.0%-41.0% and particles having a particle size less than 10 μm account for 3.5%-5.6%.

In some embodiments, the anode active material layer further includes third oriented particles having a third tilt angle $\theta_3$ inclined with respect to the direction parallel to the current collector. The third tilt angle $\theta_3$ meets $70° < \theta_3 \leq 90°$. An area of the third oriented particles is 1.0%-15.0% of a cross sectional area of the anode active material layer. In some embodiments, in the third oriented particles, particles with a particle size less than 10 μm account for 90.0% or more.

In some embodiments, the anode includes a plurality of pores, and an area of the plurality of pores is 21.0%-43.0% of a cross sectional area of the anode active material layer.

In some embodiments, the anode active material layer has a C004/C110 ratio of 17.0-27.0.

In some embodiments, the anode active material layer has a thickness of 90 μm-143 μm, and the compacted density of the anode is 1.70 g/cm³-1.90 g/cm³.

The present application also provides an electrochemical device comprising any anode as described herein.

In some embodiments, after the electrochemical device of the present application is fully charged and disassembled, the anode active material layer has a C004/C110 ratio of 10.22-19.35.

In some embodiments, in the anode of the electrochemical device of the present application that is fully discharged and disassembled, an area of the first oriented particles is 11.0%-25.0% of a cross sectional area of the anode active material layer.

In some embodiments, in the anode of the electrochemical device of the present application that is fully discharged and disassembled, an area of the second oriented particles is 29.0%-51.0% of a cross sectional area of the anode active material layer.

In some embodiments, in the anode of the electrochemical device of the present application that is fully discharged and disassembled, an area of the third oriented particles is 5.0%-19.0% of a cross sectional area of the anode active material layer.

In some embodiments, in the anode of the electrochemical device of the present application that is fully discharged and disassembled, particles with a particles size less than 10 μm account for 62.5%-87.7% of the first oriented particles.

In some embodiments, in the anode of the electrochemical device of the present application that is fully discharged and disassembled, particles with a particles size between 10 μm and 35 μm account for 12.3%-37.5% of the first oriented particles.

In some embodiments, in the anode of the electrochemical device of the present application that is fully discharged and disassembled, particles with a particles size less than 10 μm account for 2.1%-3.9% of the second oriented particles.

In some embodiments, in the anode of the electrochemical device of the present application that is fully discharged and disassembled, particles with a particles size between 10 μm and 35 μm account for 21.5%-40.2% of the second oriented particles.

In some embodiments, in the anode of the electrochemical device of the present application that is fully discharged and disassembled, particles with a particles size greater than 35 µm account for 55.9%-76.4% of the second oriented particles.

In some embodiments, in the anode of the electrochemical device of the present application that is fully discharged and disassembled, particles with a particles size less than 10 µm account for 90.0% or more of the third oriented particles.

Additional aspects and advantages of the embodiments of the present application will be described or shown in the following description or illustrated by implementing the examples of the present application.

BRIEF DESCRIPTION OF THE DRA WINGS

The following will briefly illustrate the accompanying drawings. Drawings necessary to describe the embodiments of the present application or the prior art will be briefly illustrated so as to facilitate the description of the embodiments of the present application. Obviously, the accompanying drawings described below only show some embodiments of the present application. For those skilled in the art, the drawings of other embodiments can still be obtained according to the structures illustrated in the drawings without any creative effort.

FIG. 1 is a schematic diagram showing the distribution of particles of an anode active material according to the present application, wherein orientation 1 indicates the first oriented particles as described herein, orientation 2 indicates the second oriented particles as described herein, orientation 3 indicates the third oriented particles as described herein, and the horizontal line L in the middle indicates the current collector.

DETAILED DESCRIPTION

Figure 1:
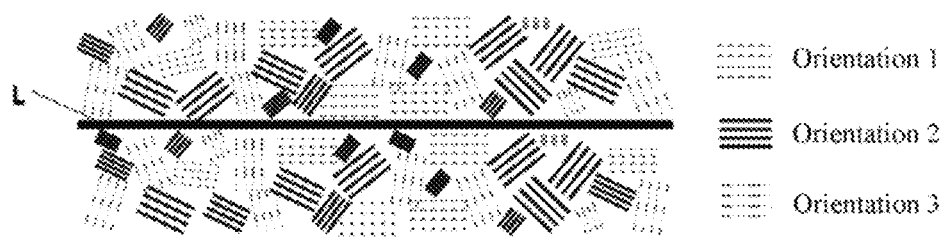
Figure 2:
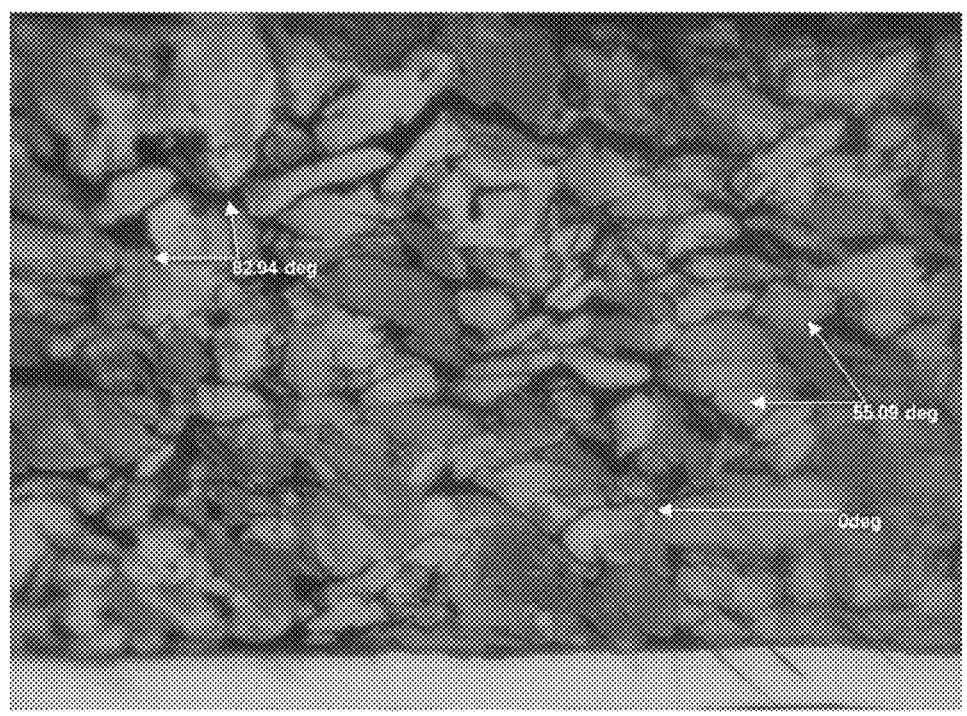
FIG. 2 is an image of an anode active material layer according to the present application under a polarization microscope.

The embodiments of the present application will be described in detail below. Throughout the specification, the same or similar components and components having the same or similar functions are denoted by similar reference numerals. The embodiments described herein with respect to the drawings are illustrative and graphical, and are used for providing a basic understanding of the present application. The embodiments of the present application should not be interpreted as limitations to the present application.

As used in the present application, terms "approximately", "substantially", "essentially", and "about" are used for describing and explaining a small variation. When being used in combination with an event or circumstance, the term may refer to an example in which the event or circumstance occurs precisely, and an example in which the event or circumstance occurs approximately. For example, when being used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if a difference between two values is less than or equal to ±10% of an average value of the value (for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), it could be considered that the two values are "substantially" the same.

Further, to facilitate a description, "first", "second", "third", and the like may be used in the present application to distinguish among different components in a diagram or a series of diagrams. The wordings "first", "second", "third", and the like are not intended to describe corresponding components.

In addition, sometimes, a quantity, a ratio, and another value are presented in a range format in the present application. It should be appreciated that such range formats are for convenience and conciseness, and should be flexibly understood as including not only values explicitly specified to range constraints, but also all individual values or sub-ranges within the ranges, such as explicitly specifying each value and each sub-range.

In the detailed description and the claims, a list of items connected by the term "at least one of" or similar terms may mean any combination of the listed items. For example, if items A and B are listed, then the phrase "at least one of A and B" means only A; only B; or A and B. In another example, if items A, B and C are listed, then the phrase "at least one of A, B and C" means only A; or only B; only C; A and B (excluding C); A and C (excluding B); B and C (excluding A); or all of A, B and C. The item A may include a single component or multiple components. The item B may include a single component or multiple components. The item C may include a single component or multiple components.

In the detailed description and the claims, a list of items connected by the term "at least one of" or similar terms may mean any combination of the listed items. For example, if items A and B are listed, then the phrase "at least one of A and B" means only A; only B; or A and B. In another example, if items A, B and C are listed, then the phrase "at least one of A, B and C" means only A; or only B; only C; A and B (excluding C); A and C (excluding B); B and C (excluding A); or all of A, B and C. The item A may include a single component or multiple components. The item B may include a single component or multiple components. The item C may include a single component or multiple components.

The anode active material is susceptible to expansion, mainly along a direction perpendicular to the current collector, after being subjected to roll and cycles of charge and discharge. Particles of the anode active material distributed in a direction parallel to the current collector are more likely to undergo expansion in the direction perpendicular to the current collector during the cycle, and particles distributed in the direction perpendicular to the current collector are more likely to undergo deformation in the direction parallel to the current collector.

By adjusting the orientation angle of the active material particles in the anode active material layer and the area ratio of the particles with each orientation relative to the cross sectional area, the present application can not only allow the anode to provide a high energy density, but also to solve the problem of expansion of the anode active material layer's thickness and deformation of the appearance and structure of the battery. In addition, the lithium ion can be intercalated in and deintercalated out of the active material layer in all directions, thereby greatly improving the rapid charge and discharge performance of the lithium ion battery.

1. Anode

A first aspect of the present application relates to an anode, which includes an anode active material layer and a current collector, wherein particles in the anode active material layer have at least two different tilt angles with respect to the direction parallel to the current collector.

In some embodiments, the anode active material layer of the present application includes first oriented particles having a first tilt angle $\theta_1$ inclined with respect to the direction parallel to the current collector, and second oriented particles having a second tilt angle $\theta_2$ inclined with respect to the direction parallel to the current collector, wherein a first tilt angle $\theta_1$ and a second tilt angle $\theta_2$ are different and both not greater than about 70°.

In some embodiments, a first tilt angle $\theta_1$ of the first oriented particles in the anode active material layer meets about $0°\leq\theta_1\leq$ about 20°, for example, about 0°, about 5°, about 8°, about 10°, about 15°, about 18°, about 20°, or any ranges there between.

In some embodiments, a second tilt angle $\theta_2$ of the second oriented particles in the anode active material layer meets about $20°<\theta_2\leq$ about 70°, for example, about 25°, about 30°, about 35°, about 40°, about 45°, about 50°, about 55°, about 60°, about 65°, about 70°, or any ranges therebetween.

In some embodiments, the anode active material layer of the present application further includes third oriented particles having a third tilt angle $\theta_3$ inclined with respect to the direction parallel to the current collector. A third tilt angle $\theta_3$ meets about $70°<\theta_3\leq$ about 90°, for example, about 75°, about 80°, about 85°, about 90°, any ranges there between.

The optical organization structures of an anisotropic anode active material with various compacted densities can be observed under a polarization microscope. Since the irradiated light propagates at the same speed in all directions when it propagates onto the surface of an isotropic material, the refractive index is independent of the direction of light propagation. For an anisotropic material, when a beam of light is incident onto its surface, two beams of refracted light will be generated, wherein one of them following the law of refraction is called ordinary light, and referred to as o-light for short, and the other following conformity to the law of refraction is called extraordinary light, and referred to as e-light for short. After refraction, these two beams of light are split into linearly polarized light perpendicular to each other. The reflection of polarized light on the surface of an optically isotropic substance follows the law of reflection. The reflectivities in all directions are the same, and the field of view will not change. The reflection of polarized light on the surface of an optically anisotropic substance has different reflectivities on different phases of grains, which is exhibited as the phenomenon of bright and dark-field extinction in the field of view.

Under a certain pressure, particles of the anode active material are arranged on the current collector in various orientations (i.e., with different tilt angles). Under a polarization microscope, the gray value and color value of particles with the same orientation are basically the same. By statistically calculating the areas of the particles with the same orientation, the area ratio of the particles with such an orientation relative to the cross-sectional area is obtained.

In some embodiments, an area ratio of the first oriented particles relative to the cross sectional area of the anode active material layer in the anode of the present application is about 9%-about 23%, for example, about 9%, about 10%, about 15%, about 17%, about 20%, about 23%, or any ranges there between.

In some embodiments, the second oriented particles in the anode of the present application have an area ratio in the cross sectional area of the anode active material layer higher than that of the first oriented particles relative to the cross sectional area of the anode active material layer. In some embodiments, an area ratio of the second oriented particles relative to the cross sectional area of the anode active material layer is about 37%-about 55%, for example, about 37%, about 40%, about 45%, about 50%, about 55%, or any ranges therebetween.

In some embodiments, an area ratio of the third oriented particles relative to the cross sectional area of the anode active material layer is about 1.0%-about 15.0%, for example, about 1.0%, about 5.0%, about 8.0%, about 10.0%, about 13.0%, about 15.0% or any ranges therebetween.

As shown in FIG. 1, in some embodiments, the anode active material layer of the present application comprises the first oriented particles, the second oriented particles, and the third oriented particles. The first oriented particles have an orientation 1 with respect to the direction parallel to the current collector (that is, a first tilt angle is about 0° to about 20°), which is substantially parallel to the current collector. The second oriented particles have an orientation 2 with respect to the direction parallel to the current collector (that is, a second tilt angle is greater than about 20° and not more than about 70°). The third oriented particles have an orientation 3 with respect to the direction parallel to the current collector (that is, a third tilt angle is greater than about 70° and not more than about 90°), which is approximately perpendicular to the current collector.

In some embodiments, the anode active material layer of the present application consists of the first oriented particles, the second oriented particles, and the third oriented particles. In some embodiments, the anode active material layer of the present application consists of the first oriented particles and the second oriented particles as described herein. In some embodiments, the anode active material layer of the present application comprises or consists of the first oriented particles and the third oriented particles as described herein. In some embodiments, the anode active material layer of the present application includes or consists of the second oriented particles and the third oriented particles as described herein.

In some embodiments, the anode active material layer has a C004/C110 ratio of about 17.0 to about 27.0, for example, about 17.0, about 18.0, about 20.0, about 22.0, about 25.0, about 27.0, or any ranges therebetween.

The anode active material used for the first oriented particles, the second oriented particles and the third oriented particles of the present application includes natural graphite, artificial graphite or a combination thereof. For crystalline graphite materials, a Bruker X-ray diffractometer is used to test the XRD according to General rules for X-ray diffractometric analysis JIS K 0131-1996 and Determination method of artificial graphite lattice parameters JB/T 4220-2011. Various peak positions represent different sizes of graphite crystal cells, which reflect the degree of graphitization of graphite materials. The peak area is obtained by integrating the peak intensity with the half-peak width. The ratio of the peak area of the 004 peak to the peak area of the 110 peak is referred to C004/C110, which affects the transport path of lithium ions.

Under normal circumstances, the graphite anode material, due to its stacked structure of sheets, tends to be distributed in a layered structure in the direction parallel to the current collector under a certain pressure. In the particles of the anode active material, if the area ratio of the first oriented particles relative to the cross sectional area is too large, this will seriously affect the infiltration of the electrolyte inside the anode, thereby affecting the transport of lithium ions, and the rate performance of lithium ion batteries. In the present application, the area ratio of the first oriented particles relative to the cross sectional area of the anode active material layer is less than about 23%, whereby the above problems can be effectively avoided.

According to the present application, when the area ratios of particles with various orientations in the anode fall within the ranges described herein, the target compacted density can be achieved. At the same time, the anode active material layer exhibits isotropic properties, which is conducive to the rapid intercalation or deintercalation of lithium ions, thus improving the charge and discharge performance. During the cycle of lithium ion batteries, in the presence of the second oriented particles with the above-mentioned area ratio in the cross-sectional area, stress generated by the intercalation or deintercalation of lithium ions into/out of the active material layers can be suppressed or offset by the forces from various directions. As a result, not only is the expansion of the lithium ion battery in the thickness direction during the cycle greatly reduced, battery deformation caused by the lateral expansion can also be effectively suppressed.

In particular, when the area ratio of the second oriented particles relative to the cross-sectional area in the anode is less than about 55%, stress in the direction perpendicular to the current collector is moderate, so as to meet the demand for high compacted density of the anode. When an area ratio of the second oriented particles relative to the cross-sectional area in the anode is greater than about 37%, the overvoltage of the anode caused by a too large area ratio of the first oriented particles relative to the cross-sectional area can be avoided, and blocking of the path of lithium ions can be avoided, and the expansion of lithium ion batteries in the thickness direction during the cycle is reduced.

In some embodiments, the first oriented particles, the second oriented particles, and the third oriented particles include primary particles and/or secondary particles. The secondary particles are particles obtained by mixing the primary particles with a binder such as asphalt and followed by graphitizing. A content of the primary particles is 20%-50%, and a content of the secondary particles is 50%-80%. The presence of secondary particles in the anode active material layer reduces the C004/C110 value of the overall anode active material layer. During the compression of the active material layer, the compressed area and direction are increased, thus an angle with respect to the plane of the current collector is still maintained after compression.

In addition, the present application also achieves its purpose by adjusting the proportion of particles with different particle sizes in various oriented particles.

In some embodiments, in the first oriented particles, particles having a particle size less than about 10 μm account for about 71.0%-about 93.0%, for example, about 71.0%, about 75%, about 78%, about 80%, about 85%, about 88%, about 90%, about 93%, or any ranges therebetween. In some embodiments, in the first oriented particles, particles having a particle size of about 10 μm-about 35 μm account for about 7.0% to about 29.0%, for example, about 7.0%, about 10.0%, about 15.0%, about 18.0%, about 20.0%, about 25.0%, about 28.0%, about 29.0%, or any ranges therebetween.

In some embodiments, in the second oriented particles, particles having a particle size between about 10 μm and about 35 μm account for about 22.0% to about 41.0%, for example, about 22.0%, about 25.0%, about 30.0%, about 35.0%, about 40.0%, about 41.0%, or any ranges therebetween. In some embodiments, in the second oriented particles, particles having a particle size less than about 10 μm account for about 3.5% to about 5.6%, for example, about 3.5%, about 4.0%, about 4.5%, about 5.0%, about 5.5%, about 5.6%, or any ranges therebetween.

In some embodiments, the third oriented particles in the anode essentially consist of particles with a particle size less than about 10 μm. For example, in the third oriented particles, particles having a particle size less than about 10 μm account for about 90.0% or more, about 95% or more, about 98% or more, about 100%, or any ranges therebetween.

In the second oriented particles, a proportion of particles with a large particle size is greater than about 22.0%. The large particles have a larger force-bearing surface therebetween, and will be under greater frictional force during the compressed process. Therefore, during the compression process, the tendency of distribution along the direction parallel to the current collector is hindered, so that the particles are eventually at a certain angle with respect to the current collector. In addition, the presence of particles with a large particle size in the second oriented particles can also ensure that the node has a high energy density.

A proportion of particles with a large particle size in the first oriented particles is less than about 29.0%, such that the degradation of the rate performance caused by the particles with a large particle size affecting the rapid intercalation or deintercalation of lithium ions can be avoided. The third oriented particles basically are a majority of particles with a small particle size. This is because the orientation 3 is mainly in the direction perpendicular to the current collector, and the predominance of small particles can avoid the particles being crushed under pressure.

In some embodiments, the anode active material layer having pores can also be observed under a polarization microscope. The pores in the anode active material layer do not show polarity under a polarization microscope, so they show a different color from that of the active layer. The proportion of the pores in the cross sectional area (excluding the area of the current collector) of the anode active material layer can be obtained through calculation. The distribution of porosity to a certain extent reflects the balance relationship between the compacted density of the anode and the infiltration by the electrolyte. If porosity is too small (e.g., less than about 21.0%), the compacted density of the anode is too high, resulting in poor infiltration by the electrolyte in the anode. If porosity is too large (e.g., more than about 43.0%), the compacted density of the anode cannot meet the demand for high energy density.

In some embodiments of the present application, a ratio of the pore relative to the cross sectional area of the anode active material layer is about 21.0%-about 43.0%, for example, about 21.0%, about 25.0%, about 30.0%, about 35.0%, about 40.0%, about 43.0%, or any ranges therebetween. When the porosity of the anode is within the above ranges, good infiltration by the electrolyte can be achieved, and expansion and deformation during the cycle process are significantly reduced.

In the anode of the present application, the anode active material layer further comprises a binder and a dispersant. The binder and the dispersant include at least one of polyvinylidene fluoride, a copolymer of vinylidene fluoride-hexafluoropropylene, a polyamide, polyacrylonitrile, a polyacrylate ester, polyacrylic acid, a polyacrylate salt, sodium carboxymethyl cellulose, polyvinylpyrrolidone, polyvinyl ether, polymethyl methacrylate, polytetrafluoroethylene, polyhexafluoropropylene, styrene-butadiene rubber, an acrylate ester, and an epoxy resin.

In some embodiments, a coating weight (CW) of the anode active material layer is about 0.090 mg/mm$^2$ to about 0.120 mg/mm$^2$, for example, about 0.090 mg/mm$^2$, about 0.095 mg/mm$^2$, about 0.100 mg/mm$^2$, about 0.105 mg/mm$^2$, about 0.110 mg/mm$^2$, about 0.120 mg/mm$^2$, or any ranges therebetween.

In some embodiments, an anode active material layer has a thickness of about 90 μm to about 143 μm, for example, about 90 μm, about 95 μm, about 100 μm, about 110 μm, about 120 μm, about 130 μm, about 140 μm, about 143 μm, or any ranges therebetween. When the thickness of the anode active material layer is within the above ranges, lithium ions can be better intercalated.

In some embodiments, the anode of the present application has a compacted density of about 1.70 g/cm$^3$ to about 1.90 g/cm$^3$, for example, about 1.70 g/cm$^3$, about 1.75 g/cm$^3$, about 1.80 g/cm$^3$, about 1.85 g/cm$^3$, about 1.88 g/cm$^3$, about 1.90 g/cm$^3$, or any ranges therebetween.

In some embodiments, the current collector of the anode is provided with a priming coat having a thickness of about 0.1 μm to about 5 μm, for example, about 0.5 μm to about 4 μm, about 0.6 μm to about 3.5 μm, or about 0.7 μm to about 3 μm.

In some embodiments, the priming coat on the current collector of the anode includes a conductive material including at least one of graphene, graphene oxide, carbon nanotubes, carbon black, hard carbon, and artificial graphite.

The orientation of the anode active material layer in the embodiments of the present application can be controlled by controlling the pressure applied to the surface of the anode active material layer. The pressure applied can be controlled by the gap between the rolls, the number of rollings, the rolling time, and the thickness of the anode active material layer.

2. Electrochemical Device

The present application also provides an electrochemical device comprising any anode as described herein.

In some embodiments, after the electrochemical device of the present application is fully charged and disassembled, an anode active material layer thereof has a C004/C110 ratio of about 10.0 to about 19.5, for example, about 10.0, about 10.22, about 10.5, about 11.0, about 12.0, about 13.0, about 14.0, about 15.0, about 16.0, about 17.0, about 18.0, about 19.0, about 19.35, about 19.5, or any ranges therebetween.

After the electrochemical device of the present application is fully discharged and disassembled, the anode is subjected to cross section polishing (CP) and polarization analysis. In some embodiments, an area ratio of the first oriented particles relative to the cross sectional area of the anode active material layer is about 11.0% to about 25.0%, for example, about 11.0%, about 13.0%, about 15.0%, about 18.0%, about 20.0%, about 25.0% or any ranges therebetween. In some embodiments, an area ratio of the second oriented particles relative to the cross sectional area of the anode active material layer is about 29.0% to about 51.0%, for example, about 29.0%, about 30.0%, about 35.0%, about 40.0%, about 42.0%, about 45.0%, about 50.0%, about 51.0% or any ranges therebetween. In some embodiments, an area ratio of the third oriented particles relative to the cross sectional area of the anode active material layer is about 5.0% to about 19.0%, for example, about 5.0%, about 8.0%, about 10.0%, about 13.0%, about 15.0%, about 17.0%, about 19.0% or any ranges therebetween.

In some embodiments, after the electrochemical device of the present application is fully discharged and disassembled, an anode has any one of the following features: (1) in the first oriented particles, particles having a particle size less than about 10 μm account for about 62.5% to about 87.7%, and particles having a particle size between about 10 μm and about 35 μm account for about 12.3% to about 37.5%; (2) in the second oriented particles, articles having a particle size less than about 10 μm accounts for about 2.1% to about 3.9%, particles having a particle size between about 10 μm and about 35 μm account for about 21.5% to about 40.2%, and particles having a particle size greater than about 35 μm account for about 55.9% to about 76.4%; and (3) in the third oriented particles, particles having a particle size less than about 10 μm account for about 90.0% or more.

The electrochemical device produced with the anode of the present application is suitable for use in electronic devices in various fields.

The use of the electrochemical device of the present application is not particularly limited and can be used for any purpose known in the art. In an embodiment, the electrochemical device according to the present application is applicable to, without limitation, notebook computers, pen-input computers, mobile computers, e-book players, portable phones, portable fax machines, portable copiers, portable printers, head-mounted stereo headphones, video recorders, LCD TVs, portable cleaners, portable CD players, minidisc players, transceivers, electronic notebooks, calculators, memory cards, portable recorders, radios, backup power sources, motors, vehicles, motorcycles, scooters, bicycles, lighting apparatus, toys, game consoles, clocks, electric tools, flash lights, cameras, large batteries for household use, and lithium ion capacitors.

EXAMPLES

Implementations of the present application are illustrated by way of examples below. It is to be understood that these examples are merely illustrative of the present application and are not intended to limit the claimed protection scope of the present application.

Example 1

1. Preparation of Anode:

An anode active material of graphite (comprising 20%-60% of primary particles and 40%-80% of secondary particles), the binder of styrene-butadiene rubber (SBR) and the thickener of sodium carboxymethyl cellulose (abbreviated as CMC) were thoroughly stirred and mixed at a weight ratio of 95:2:3 in deionized water as a solvent to form a uniform anode slurry. The slurry was applied on a copper foil as a current collector that was pre-coated with a priming coat (for example, carbon black) having a thickness of 1.5 μm, and dried. The coated anode was cold-pressed under different roll pressures, cut, and welded with tabs. The coating weight was 0.100 mg/mm$^2$, the coating thickness was 130 μm, and the compacted density was 1.70 g/cm$^3$ to 1.88 g/cm$^3$. Thereby, anodes with different compacted densities were obtained. The thickness and width of the anodes under different compacted densities were collected.

2. Preparation Process of Cross Section Polished Anode Samples:

The treated anode above was cut into a size of 0.5 cm×1 cm. The cut anode was attached to a silicon wafer carrier having a size of 1 cm×1.5 cm by using a conductive adhesive. One end of the anode was polished with argon ions (parameters: acceleration voltage of 8 KV; 4 hrs for each sample). Polishing with argon ions is a process wherein a high-voltage electric field is used to ionize argon to produce an ionic state of the argon ions that bombard the surface of the anode at a high speed under an acceleration voltage, such that the anode is corroded layer by layer to achieve the effect of polishing.

After the anode sample was prepared, it was analyzed under a polarization microscope.

3. Operation with Polarization Microscope

Image acquisition process: An Axio imager upright microscope (Carl Zeiss AG, Imagine A2) was used for image acquisition. An AxioCam MRc5 digital camera was connected to a polarization microscope by a connector, and a polarized-light optical microscopy image was taken with a shutter time of 1.6 s. The images captured by the camera were automatically transferred to a computer.

Image analysis process: An image of 1200 pixels×1600 pixels was selected as an analysis object (which is equivalent to a field of view of 480 μm×540 μm). The analysis was performed using Axio Vision's Multiphase software. After importing the acquired photos into the software, a point with an orientation on the image was clicked, then all the areas that had a gray value and color value identical to those of the tested object were also selected. Points with other orientations were also selected using the same method. As such, areas with different orientations and different colors were obtained. The first tilt angle of the first oriented particles was $0°≤θ_1≤20°$, and the second tilt angle of the second oriented particles was $20°<θ_2≤70°$. The data of particles with various orientations in the image and their areas were respectively measured using AxioVision's automatic calculation software (Axio Vision SE64 Rel.4.9).

4. Preparation of Lithium-Ion Battery (1) Preparation of cathode: The cathode active material of lithium cobalt oxide (having the molecular formula of $LiCoO_2$), the conductive agent of acetylene black, and the binder of polyvinylidene fluoride (PVDF) were stirred and mixed fully at a weight ratio of 96:2:2 in a suitable amount of N-methylpyrrolidone (NMP) as a solvent, to form a uniform cathode slurry. The slurry was applied to a cathode current collector of Al foil, dried, cold pressed, cut, and welded with tabs to obtain a cathode.

(2) Preparation of anode: The anode prepared in Step 1 above was used.

(3) Separator: A porous PE polymer film having a thickness of 7 μm was used as a separator.

(4) Preparation of electrolyte: Under a dry argon atmosphere, ethylene carbonate, propylene carbonate, and diethyl carbonate at a weight ratio of about 1:1:1 were mixed, and then $LiPF_6$ was added and mixed uniformly to form a basic electrolyte, wherein the concentration of $LiPF_6$ was 1.15 mol/L. Based on the total weight of the electrolyte, 3% fluoroethylene carbonate and 2% adiponitrile were added and mixed uniformly to obtain the electrolyte.

(5) Preparation of lithium ion battery: The cathode, the separator, and the anode were laminated in order such that the separator was located between the cathode and the anode. Then, they were wound up, and placed in an outer packaging foil. The electrolyte prepared above was injected, and after vacuum packaging, standing, formation, shaping, and other procedures, a lithium ion battery was obtained.

5. Electrical Performance Test of the Battery (1) Full Charge/Discharge of Battery Full charge of battery: The test battery was allowed to stand for 5 min at a test temperature of 25° C. The lithium-ion battery was charged to 4.4V at a constant current of 0.7C, and then to 0.05C at a constant voltage of 4.4V.

Full discharge of battery: The test battery was allowed to stand for 5 min at a test temperature of 25° C. The lithium-ion battery was discharged to 3V at a constant current of 0.5C.

(2) Test of Lithium Precipitation on Anode

The test battery was allowed to stand for 5 min at a test temperature of 25° C. The lithium-ion battery was charged to 4.4V at a constant current of 0.7C, and then to 0.05C at a constant voltage of 4.4V; allowed to stand for 5 min; and discharged to 3.0V at a constant current of 0.5C and allowed to stand for 5 min. After the above charge and discharge process was repeated 10 times, the battery was fully charged, disassembled in a dry chamber, and photographed to record the state of the anode.

Determination of degree of lithium precipitation: This was determined according to the state of the anode after being fully charged and disassembled. When the anode overall appears golden yellow and the area appearing gray represents less than 2%, it is determined as no lithium precipitation. When the anode largely appears golden yellow, gray is visible at some positions, and the area appearing gray represents from 2% to 20%, it is determined as slight lithium precipitation. When the anode is partially gray, and partially golden yellow, and the area appearing gray represents from 20% to 60%, it is determined as lithium precipitation. When the anode largely appears gray, and the area appearing gray represents greater than 60%, it is determined as serious lithium precipitation.

(3) Direct Current Resistance (DCR) Test

The lithium-ion battery was charged to 4.4V at a constant current of 1.5C, and then to 0.05C at a constant voltage; allowed to stand for 30 min; and discharged at 0.1C for 10 s (sampled once every 0.1 s to record the corresponding voltage U1), and then discharged at 1C for 360 s (sampled once every 0.1 s to record the corresponding voltage U2). The charge and discharge procedure was repeated 5 times. "1C" is the current value when the battery capacity is completely discharged within 1 hr.

DCR is calculated according to the formula DCR=(U2−U1)/(1C−0.1C). The DCR mentioned in the present application is a value at 50% SOC (state of charge).

(4) Electrochemical Impedance Spectrum (EIS)

a) Preparation of three-electrode battery and lithium plating: The preparation process is the same as that described above for preparing a lithium ion battery. A copper wire was connected to the battery as a reference electrode during the preparation process of the lithium ion battery. The anodes were plated with lithium for 6 hrs at a current of 20 ρA, and then tested for EIS after lithium plating.

b) EIS test step: A three-electrode battery plated with lithium was connected to a Bio-Logic VMP3B electrochemical workstation produced by Bio-Roger and tested at a frequency ranging from 30 mHz to 50 kHz, and an amplitude of 5 mV. After being collected, the data was analyzed with the complex-plane impedance spectrum to obtain the data of Rct.

(5) Expansion Test of Anode in X/Y-Axis Direction

Figure 3:
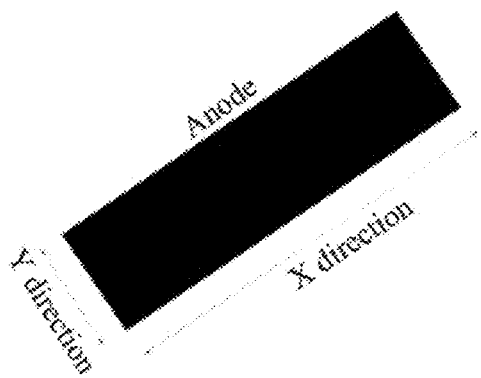
FIG. 3 shows the X- and Y-axis directions of an anode in an expansion test according to the present application.

The test battery was allowed to stand for 5 min at a test temperature of 25° C. The lithium ion battery was charged to 4.4V at a constant current of 0.7C and then to 0.05C at a constant voltage of 4.4V. The battery was disassembled in a dry chamber. Part of the anode was cut out, and the width of the anode along the X/Y-axis direction was determined using an on-line width measuring instrument (CCD) and compared with the width of the anode in Step 1 (Preparation of anode), to obtain the expansion rate of the anode along the X/Y axis. The expansion of an anode along the X/Y-axis direction refers to the growth of the anode along the X/Y-axis direction. X and Y axis directions are as shown in FIG. 3.

Figure 4:
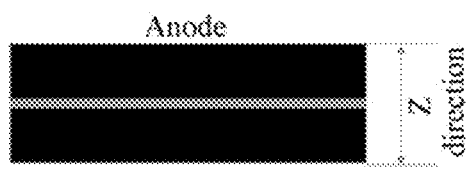
FIG. 4 shows the Z-axis direction of an anode in the expansion test at 50% SOC according to the present application.

(6) Expansion Test Along the Z Axis of Anode at 50% SOC a) The test battery was allowed to stand for 5 min at a test temperature of 25° C. The lithium-ion battery was charged to 3.85V at a constant current of 0.7C (that is, 50% SOC), and then disassembled in a dry chamber. The thickness of the anode was recorded (number of sampled points >14).

b) The thickness of the anode was compared with the thickness of anodes of various compacted densities in Step 1 (Preparation of node) to obtain the expansion rate of the anode along the Z-axis direction. The Z-axis direction is as shown in FIG. 4.

(7) Expansion Test of Battery after Cycles

The test battery was allowed to stand for 5 min at a test temperature of 45° C. The initial thickness of the battery ($PPG_0$ and $MMC_0$) was recorded. The lithium-ion battery was charged to 4.4V at a constant current of 0.7C, and then to 0.05C at a constant voltage of 4.4V. The thickness of the battery ($PPG_1$ and $MMC_1$) was recorded. The battery was allowed to stand for 5 min; and discharged to 3.0V at a constant current of 0.5C and allowed to stand for 5 min. The charge and discharge process was repeated 500 times. For the first 200 cycles, the battery thickness was recorded every 50 cycles of charge and discharge, and for the following 201 cycles-500 cycles, the battery thickness was recorded every 100 cycles ($PPG_x$ and $MMC_x$, wherein X represents the number of cycles), and the residual capacity after each cycle of charge and discharge was recorded.

PPG test: In the PPG test, a PPG soft pack battery thickness gauge (manufactured by Shenzhen Altomei Automation Technology Co., Ltd.) was used for automatic detection. The test process was as follows. The battery was placed on the lower test panel of the instrument, and the upper cover was lowered at a uniform speed during the test. The thickness of the battery was measured by pressure sensing.

MMC test: The MMC test was carried out by using a micrometer tester (manufactured by Mitutoyo, model: MDC-25SX) to measure the thickness of the tab of the cathode in the battery at three points ($MMC1_x$, $MMC2_x$, and $MMC3_x$), wherein the numbers 1, 2 and 3 correspond to different test positions, the subscript x corresponds to the number of cycles. $MMC_x=(MMC1_x+MMC2_x+MMC3_x)/3$, MMC expansion=$(MMC_x-MMC_0)/MMC_0\times100\%$.

Battery deformation was calculated from the recorded battery thickness. Expansion deformation after cycling at 45° C.=$[PPG_x/(Max(MMC1_x, MMC2_x, MMC3_x))-1]\times100\%$, wherein $Max(MMC1_x, MMC2_x, MMC3_x)$ represents the maximum value of the three test points.

(8) Rate Test of Battery

The test battery was allowed to stand for 5 min at a test temperature of 25° C. The lithium-ion battery was charged to 4.4V at a constant current of 0.7C, and then to 0.05C at a constant voltage of 4.4V; allowed to stand for 5 min; and discharged to 3.0V at a constant current of 2C and allowed to stand for 5 min. The discharge capacity was recorded, and compared with the discharge capacity at 0.1C to calculate the discharge capacity retention rate.

Discharge capacity retention rate=discharge capacity at 2C/discharge capacity at 0.1C×100%

(9) Deformation (Rippling) During 150% SOC Process

The test battery was allowed to stand for 5 min at a test temperature of 25° C., and the initial battery thickness ($PPG_0$ and $MMC_0$, respectively) was recorded. Then the lithium ion battery was charged to 4.4V at a constant current of 0.5C and then to 0.025C at a constant voltage of 4.4V (that is, 100% SOC), then charged for 1 hr at a constant current of 0.1C, and stood for 30 min. The battery thickness was recorded. The process of charging at a constant current of 0.1C was repeated 5 times (wherein 110% SOC, 120% SOC, 130% SOC, 140% SOC, and 150 SOC % corresponded to the first, second, third, fourth, and fifth recharge process, respectively). Each charge process was continued for 1 hr, and the battery was stood for 30 min after each charge process. The battery thickness was recorded ($PPG_x$ and $MMC_x$ respectively, wherein X=1, 2, 3, 4, and 5). After the test was completed, the battery deformation was calculated. Deformation during 150% SOC process=$[PPG_x/(Max(MMC1_x, MMC2_x, MMC3_x))-1]\times100\%$, wherein $Max(MMC1_x, MMC2_x, MMC3_x)$ represents the maximum value of the three test points.

Table 1 shows the relationship between the orientation of the anode active material and the electrical performance of the same anode material used in Examples 1-6 and Comparative Example 1 at various compacted densities.

TABLE 1

|  | Compacted density, g/cm³ | Proportion of the first orientation | Proportion of the second orientation | Lithium precipitation at 25° C. | Expansion after cycling (500 times) at 45° C. |
|---|---|---|---|---|---|
| Example 1 | 1.70 | 9% | 39% | No lithium precipitation | 2.0% |
| Example 2 | 1.74 | 11% | 41% | No lithium precipitation | 2.6% |
| Example 3 | 1.78 | 16% | 42% | No lithium precipitation | 2.7% |
| Example 4 | 1.82 | 18% | 45% | Slight lithium precipitation | 2.8% |
| Example 5 | 1.86 | 20% | 49% | Slight lithium precipitation | 3.1% |
| Example 6 | 1.90 | 23% | 52% | Lithium precipitation | 3.5% |
| Comparative Example 1 | 1.93 | 45% | 42% | Severe lithium precipitation | 7.9% |

The comparison between Examples 1-6 and Comparative Example 1 in Table 1 shows that the compacted density of Comparative Example 1 is much larger than the compacted density range defined in the claims, and the battery is deformed seriously. This is because when the compacted density is large, the porosity decreases sharply, the particles are mostly arranged at an angle in the direction parallel to the current collector, and the pores between the particles are notably reduced, resulting in poor infiltration by the electrolyte. The contact area between the material and the electrolyte is greatly reduced, so that the intercalation or deintercalation of ions is severely hindered, causing deposition of lithium ions on the surface of the anode, which is exhibited as severe lithium precipitation.

Table 2 shows the relationship between the orientation of the anode active material and the electrical performance of the different anode materials used in Examples 7-28 and Comparative Example 2 at various compacted densities, where the third tilt angle of the third oriented particles is $70°<\theta_3\leq 90°$.

The comparison between Examples 7-28 and Comparative Example 2 in Table 2 shows that the compacted density of Comparative Example 2 goes beyond the compacted density range defined in the claims, and severe lithium precipitation on the anode occurs. This is because the particles are mostly arranged at an angle in the direction parallel to the current collector, resulting in poor infiltration by the electrolyte. The contact area between the material and the electrolyte is greatly reduced, so that the intercalation or deintercalation of ions is severely hindered, causing deposition of lithium ions on the surface of the anode, which is exhibited as severe lithium precipitation.

As shown by the analysis of Example 13 and Example 26, with the same compacted density and similar proportions of the second orientation and the third orientation, when the proportion of the first orientation exceeds the defined range, it is found that compared with the orientation distribution falling within the defined range in Examples 7-12, lithium precipitation is more likely to occur in Example 26. As shown by the analysis of Example 9 and Example 27, with

TABLE 2

|  | Compacted density, g/cm³ | Proportion of the first orientation | Proportion of the second orientation | Proportion of the third orientation | Lithium precipitation at 25° C. | Expansion after cycling (500 times) at 45° C. |
|---|---|---|---|---|---|---|
| Example 7 | 1.78 | 9% | 55% | 3% | No lithium precipitation | 1.50% |
| Example 8 | 1.78 | 9% | 49% | 7% | No lithium precipitation | 1.30% |
| Example 9 | 1.78 | 9% | 41% | 15% | No lithium precipitation | 1.90% |
| Example 10 | 1.78 | 16% | 48% | 1% | No lithium precipitation | 1.20% |
| Example 11 | 1.78 | 16% | 42% | 7% | No lithium precipitation | 1.30% |
| Example 12 | 1.78 | 23% | 41% | 1% | No lithium precipitation | 1.20% |
| Example 13 | 1.78 | 23% | 37% | 5% | No lithium precipitation | 1.40% |
| Example 14 | 1.8 | 9% | 54% | 7% | No lithium precipitation | 1.60% |
| Example 15 | 1.8 | 9% | 46% | 15% | No lithium precipitation | 2.40% |
| Example 16 | 1.8 | 16% | 53% | 1% | No lithium precipitation | 1.70% |
| Example 17 | 1.8 | 16% | 47% | 7% | No lithium precipitation | 2.30% |
| Example 18 | 1.8 | 16% | 39% | 15% | No lithium precipitation | 2.40% |
| Example 19 | 1.8 | 23% | 46% | 1% | Slight lithium precipitation | 1.80% |
| Example 20 | 1.8 | 23% | 40% | 7% | Slight lithium precipitation | 2.30% |
| Example 21 | 1.83 | 9% | 49% | 15% | Slight lithium precipitation | 2.70% |
| Example 22 | 1.83 | 16% | 50% | 7% | Slight lithium precipitation | 2.30% |
| Example 23 | 1.83 | 16% | 42% | 15% | Slight lithium precipitation | 2.80% |
| Example 24 | 1.83 | 23% | 49% | 1% | Slight lithium precipitation | 2.20% |
| Example 25 | 1.83 | 23% | 43% | 7% | Slight lithium precipitation | 2.60% |
| Example 26 | 1.78 | 26% | 37% | 7% | Slight lithium precipitation | 3.60% |
| Example 27 | 1.78 | 9% | 41% | 20% | Slight lithium precipitation | 4.40% |
| Example 28 | 1.78 | 32% | 31% | 4% | Severe lithium precipitation | 4.10% |
| Comparative Example 2 | 1.92 | 44% | 37% | 2% | Severe lithium precipitation | 7.70% | the same compacted density and same proportions of the first orientation and the second orientation, although the increase of the third orientation can facilitate the intercalation and deintercalation of lithium ions to reduce lithium precipitation, the battery is prone to deformation when the proportion of the third orientation exceeds a defined range. Lithium precipitation and deformation are both alleviated in Examples 7-12 that fulfill the orientation conditions provided in the present application. This is because under a certain pressure, when the orientation distribution of the particles meets the range defined in the claims, the target compacted density is ensured to be achieved and meanwhile the anode is isotropic, such that it is beneficial to the infiltration inside the anode by the electrolyte, facilitates the transport of lithium ions and improves the charge and discharge performance. During the cycle process of lithium ion batteries, because the first orientation is distributed at various angles, stress generated by lithium ions during intercalation and de-intercalation can be effectively dispersed to various angles instead of being focused to a certain fixed direction. This greatly reduces battery deformation caused by lateral expansion during the cycle process.

direction parallel to the current collector, which is not conducive to the infiltration by the electrolyte and causes a risk of exacerbated lithium precipitation. In addition, the greater the pressure applied to the surface of the anode, the more severe the battery deformation is. This is because the increase in the proportion of the first orientation causes the stress generated by the intercalation and deintercalation of lithium ions to be mainly released in a direction perpendicular to the current collector, which also easily causes battery deformation.

Table 3 gives relevant parameters of Example 11, Examples 29-34 and Comparative Example 3, and the effect of the particle size distribution of each orientation on lithium precipitation at 0.7C/0.5C at 25° C., battery expansion after cycling 500 times at 45° C., and direct current resistance (DCR) of the battery when the anode has a compacted density of 1.78 g/cm$^3$, a proportion of the first orientation of 15%, a proportion of the second orientation of 42%, and a proportion of the third orientation of 8%.

TABLE 3

| | Proportion of particle size of the first oriented particles | | Proportion of particle size of The second oriented particles | | | Proportion of particle size of the third oriented particles | Lithium precipitation at 25° C. | Battery expansion after cycling 500 times at 45° C. (average MMC$_{500}$) | DCR/ (mΩ) |
|---|---|---|---|---|---|---|---|---|---|
| | <10 μm | 10 μm-35 μm | <10 μm | 10 μm-35 μm | >35 μm | <10 μm | | | |
| Example 11 | 85% | 15% | 5.60% | 32.00% | 62.40% | 100% | No lithium precipitation | 8.20% | 56 |
| Example 29 | 72% | 28% | 4.20% | 35.00% | 60.80% | 100% | No lithium precipitation | 8.90% | 55.2 |
| Example 30 | 92% | 8% | 4.20% | 35.00% | 60.80% | 100% | No lithium precipitation | 7.80% | 55.4 |
| Example 31 | 85% | 15% | 3.50% | 30.00% | 66.50% | 100% | No lithium precipitation | 8.30% | 56.5 |
| Example 32 | 85% | 15% | 4.30% | 22.70% | 73.00% | 100% | No lithium precipitation | 8.50% | 56.2 |
| Example 33 | 85% | 15% | 4.50% | 41.00% | 54.50% | 100% | No lithium precipitation | 7.60% | 56.4 |
| Example 34 | 85% | 15% | 4.60% | 42.00% | 53.40% | 100% | No lithium precipitation | 7.40% | 56.6 |
| Comparative Example 3 | 55% | 45% | 3.50% | 22.70% | 73.80% | 100% | Slight lithium precipitation | 9.70% | 68.8 |

As shown by the analysis of Examples 7-9, 10-11, and 12-13, under the same compacted density, battery deformation get worse as the proportion of the third orientation increases, but still keeps in a low level. Examples 14-20 and Examples 21-25 show the same pattern. The reason is same as described above. When the proportion of the third orientation increases, the proportion of particles in the anode active material particles that is at an angle of 70° to 90° with respect to the orientation of the current collector increases. Although it is beneficial to shorten the diffusion path of the lithium ions, stress generated by the intercalation and deintercalation of lithium ions is mainly released in the direction parallel to the current collector, which easily causes battery deformation.

The proportions of the three orientations in Example 9, Example 15 and Example 19 are similar. As the proportion of the first orientation increases significantly, the proportions of the second orientation and the third orientation decrease significantly, the degree of lithium precipitation increases. This may be due to that when the force applied on the particles increases, more particles tend to align in the As shown in Table 3, analysis of Example 11, Examples 29-34, and Comparative Example 3 show that when the proportion of large particles in the first orientation exceeds a certain range, both the anode expansion and DCR increase significantly. This may be because most of the particles of the first orientation are arranged in a direction parallel to the current collector. If a proportion of large particles is too large, on the one hand, infiltration by the electrolyte is reduced, and on the other hand, the path of lithium ions intercalating in graphite becomes longer because of the large proportion of large particles. As a result, the DCR is increased, and the larger particles are amenable to a larger stress than the small particles during the intercalation and deintercalation of the lithium ions, and are more likely to be caused to expand in the direction perpendicular to the anode, so battery expansion significantly increases. The method of measuring the porosity in the cross section of the anode active material layer is the same as the sampling method for the orientation test of the anode. Similarly, the cross section of the anode is photographed through a polarization microscope. The pores in the cross section are statistically counted, the porosity, and the area ratios of the anode active material and binder in the cross section are calculated by the area method.

Table 4 shows the effect of the porosity in the cross section of the anode active material layer tested at a certain compacted density and a certain orientation on the direct current resistance (DCR), electrochemical impedance spectroscopy (EIS), and rate performance of the battery.

TABLE 4

|  | Porosity | DCR/(mΩ) | Rct (mΩ) | Rate/% |
|---|---|---|---|---|
| Example 11 | 25% | 56 | 5.9 | 83.90% |
| Example 35 | 21% | 58.7 | 7.9 | 78.60% |
| Example 36 | 28% | 54.3 | 5.7 | 82.40% |
| Example 37 | 35% | 57.9 | 6.6 | 80.60% |
| Example 38 | 43% | 60.2 | 8 | 78.90% |
| Comparative Example 4 | 15% | 87.5 | 12.1 | 63.20% |

It can be found through the analysis of Examples 11 and 35-38 and Comparative Example 4 that when the porosity is in the range of 21%-43%, the DCR, Rct and rate performance are all improved to some extent. This is because the porosity in such a range allows the electrolyte to penetrate into the surface of the graphite layer more easily, such that lithium ions can directly reach the surface of the graphite to complete lithium intercalation, which greatly shortens the transmission path of the lithium ions, enables the SEI film to have a thickness in a proper range, and reduces excessive lithium ions loss. When the porosity is too small, infiltration by electrolyte is reduced and the interface formed is unstable due to the overly close contact between the particles, such that DCR, EIS, and rate performance are deteriorated, as shown in Comparative Example 5.

Table 5 shows C004/C110 of the anode before and after charge, the X/Y expansion rate of the anode, the expansion rate of the anode disassembled after the battery is charged to 50% SOC, and deformation of the battery after cycling 500 times at 45° C. in Example 11, Examples 39-42 and Comparative Example 5.

TABLE 5

|  | C004/C110 before charge | C004/C110 after charge | X/Y expansion of anode after full charge | Anode expansion at 50% SOC | Deformation upon overcharge at 150% SOC |
|---|---|---|---|---|---|
| Example 11 | 17.1 | 10.22 | 0.43 | 15.89% | 1.15% |
| Example 39 | 19.56 | 12.37 | 0.35 | 16.62% | 0.98% |
| Example 40 | 21.72 | 15.36 | 0.33 | 16.68% | 0.82% |
| Example 41 | 23.43 | 17.77 | 0.29 | 17.33% | 0.52% |
| Example 42 | 26.28 | 19.35 | 0.23 | 18.02% | 0.43% |
| Comparative Example 5 | 32 | 23.45 | 0.17 | 25.25% | 5.72% |

Based on the previous research, Example 11, Examples 39-42, and Comparative Examples 5 further reveal the changes in C004/C110 before and after charge, the expansion of the anode along the X/Y direction, the expansion rate of the anode disassembled after the battery is charged to 50% SOC, and battery deformation at 150% SOC at 25° C. C004/C110 is controlled within a certain range before and after charge. With the increase of C004/C110, the X/Y expansion rate of the anode after full charge decreases. It is generally considered that if the X/Y expansion rate of the anode after full charge is controlled within 0.5%, the risk of deformation of the battery is small. At 25° C., the deformation data after the battery is charged to 150% SOC also verifies this conclusion (battery deformation of <3% is in a normal range). The C004/C110 ratio controlled to be ≥17.0 is beneficial to controlling the deformation of the battery. However, as C004/C110 increases, the anode expansion at 50% SOC also increases. As shown in Comparative Example 5, to maintain the anode expansion in a certain range, the C004/C110 ratio should be controlled within the range of ≤27.0.

Table 6 shows effect of the orientation of the anode particles in the anode after full discharge and the porosity in the cross section of the anode active material layer tested on the direct current resistance (DCR), electrochemical impedance spectroscopy (EIS), and rate performance of the battery in Example 11, Example 36, and Example 37.

TABLE 6

| | Proportion of the first orientation | Proportion of the second orientation | Proportion of the third orientation | Porosity | DCR/(mΩ) | Rct mΩ | Rate % |
|---|---|---|---|---|---|---|---|
| Example 11 | 15% | 37% | 16% | 21% | 60.3 | 7.9 | 78.6% |
| Example 36 | 19% | 40% | 11% | 28% | 54.3 | 5.7 | 82.4% |
| Example 37 | 23% | 49% | 8% | 35% | 57.9 | 6.6 | 80.6% |

Based on the above researches, Example 11, Example 36, and Example 37 show the proportions of the first, the second, and the third oriented particles in the anode after full discharge.

Example 11, Example 39, and Example 42 in Table 7 illustrate, the proportions of the particle size of the differently oriented particles in an anode after the anode is disassembled after fully discharged; the expansion rate of the disassembled anode at C004/C110 and 50% SOC before and after charging; and the battery deformation under 150% SOC at 25° C.

TABLE 7

| | Proportion of particles with different particle sizes in the first oriented particles | | Proportion of particles with different particle sizes in the second oriented particles | | | Proportion of particles with different particle sizes in the third oriented particles | | C004/C110 before charge | C004/C110 after charge | X/Y expansion of anode after full charge | Expansion at 50% SOC | Deformation upon overcharge at 150% SOC |
|---|---|---|---|---|---|---|---|---|---|---|---|---|
| | <10 μm | 10 μm–35 μm | <10 μm | 10 μm–35 μm | >35 μm | <10 μm | 10 μm–35 μm | | | | | |
| Example 11 | 63.5% | 36.5% | 4.6% | 42.0% | 53.4% | 90.0% | 10% | 17.10 | 10.22 | 0.43 | 15.89% | 1.15% |
| Example 39 | 73.5% | 26.5% | 4.2% | 35.0% | 60.8% | 95.0% | 5.0% | 19.56 | 12.37 | 0.35 | 16.62% | 0.98% |
| Example 42 | 85.5% | 14.5% | 3.2% | 39.1% | 57.5% | 97.0% | 3.0% | 26.28 | 19.35 | 0.23 | 18.02% | 0.43% |

Based on the above researches, Example 11, Example 39, and Example 42 show the proportions of particles with different particle sizes in the first, second, and third oriented particles in the anode after the battery is fully discharged.

Throughout the specification, references to "embodiment", "part of embodiments", "one embodiment", "another example", "example", "specific example" or "part of examples" mean that at least one embodiment or example of the present application includes specific features, structures, materials or characteristics described in the embodiment or example. Thus, the descriptions appear throughout the specification, such as "in some embodiments," "in an embodiment," "in one embodiment," "in another example," "in an example," "in a particular example" or "for example," are not necessarily the same embodiment or example in the application. Furthermore, the specific features, structures, materials or characteristics in the descriptions can be combined in any suitable manner in one or more embodiments or examples.

Although illustrative embodiments have been shown and described, it should be understood by those skilled in the art that the above embodiments cannot be interpreted as limitations to the present application, and the embodiments can be changed, substituted and modified without departing from the spirit, principle and scope of the present application.

What is claimed is:

1. An electrochemical device, comprising an anode; the anode comprising a current collector and an anode active material layer disposed on the current collector; wherein the anode active material layer comprises first oriented particles having a first tilt angle $\theta_1$ inclined with respect to a direction parallel to the current collector, and second oriented particles having a second tilt angle $\theta_2$ inclined with respect to the direction parallel to the current collector; wherein the first tilt angle $\theta_1$ and the second tilt angle $\theta_2$ are different, $0°\leq\theta_1\leq20°$, and $20°<\theta_2\leq70°$; and in the first oriented particles, particles having a particle size between 10 μm and 35 μm account for 7.0%-29.0%.

2. The electrochemical device according to claim 1, wherein in a cross sectional area of the anode active material layer, an area of the first oriented particles is 9%-23% of the cross sectional area of the anode active material layer.

3. The electrochemical device according to claim 1, wherein in the first oriented particles, particles having a particle size of less than 10 μm account for 71.0%-93.0%.

4. The electrochemical device according to claim 1, wherein the second oriented particles have an area ratio in a cross sectional area of the anode active material layer higher than that of the first oriented particles.

5. The electrochemical device according to claim 1, wherein in a cross sectional area of the anode active material layer, an area of the second oriented particles is 37%-55% of the cross sectional area of the anode active material layer.

6. The electrochemical device according to claim 1, wherein in the second oriented particles, particles having a particle size between 10 μm and 35 μm account for 22.0%-41.0% and particles having a particle size less than 10 μm account for 3.5%-5.6%.

7. The electrochemical device according to claim 1, wherein the anode active material layer further comprises third oriented particles having a third tilt angle $\theta_3$ inclined with respect to the direction parallel to the current collector, wherein $70°<\theta_3\leq90°$; and in a cross sectional area of the anode active material layer, an area of the third oriented particles is 1.0%-15.0% of the cross sectional area of the anode active material layer.

8. The electrochemical device according to claim 7, wherein in the third oriented particles, particles having a particle size of less than 10 μm account for 90.0% or more.

9. The electrochemical device according to claim 1, wherein the anode active material layer includes a plurality of pores; and in a cross sectional area of the anode active material layer, an area of the plurality of pores is 21.0%-43.0% of the cross sectional area of the anode active material layer.

10. The electrochemical device according to claim 1, wherein the anode active material layer has a C004/C110 ratio of 17.0-27.0.

11. The electrochemical device according to claim 1, wherein the anode active material layer has a thickness of 90 µm-143 µm, and the anode has a compacted density of 1.70 g/cm$^3$-1.90 g/cm$^3$.

12. The electrochemical device according to claim 1, wherein after the electrochemical device is fully charged and disassembled, the anode active material layer has a C004/C110 ratio of 10.22-19.35.

13. The electrochemical device according to claim 1, wherein after the electrochemical device is fully discharged and disassembled, an area of the first oriented particles is 11.0%-25.0% of a cross sectional area of the anode active material layer in the cross sectional area of the anode active material layer.

14. The electrochemical device according to claim 1, wherein after the electrochemical device is fully discharged and disassembled, an area of the second oriented particles is 29.0%-51.0% of a cross sectional area of the anode active material layer in the cross sectional area of the anode active material layer.

15. The electrochemical device according to claim 7, wherein after the electrochemical device is fully discharged and disassembled, an area of the third oriented particles is 5.0%-19.0% of a cross sectional area of the anode active material layer in the cross sectional area of the anode active material layer.

16. The electrochemical device according to claim 1, wherein after the electrochemical device is fully discharged and disassembled, in the first oriented particles, particles having a particle size of less than 10 µm account for 62.5%-87.7%.

17. The electrochemical device according to claim 1, wherein after the electrochemical device is fully discharged and disassembled, in the first oriented particles, particles having a particle size of 10 µm-35 µm account for 12.3%-37.5%.

18. The electrochemical device according to claim 1, wherein after the electrochemical device is fully discharged and disassembled, in the second oriented particles, particles having a particle size of less than 10 µm account for 2.1%-3.9%, and particles having a particle size of 10 µm-35 µm account for 21.5%-40.2%.

19. The electrochemical device according to claim 1, wherein after the electrochemical device is fully discharged and disassembled, in the second oriented particles, particles having a particle size of greater than 35 µm account for 55.9%-76.4%.

20. The electrochemical device according to claim 7, wherein after the electrochemical device is fully discharged and disassembled, in the third oriented particles, particles having a particle size of less than 10 µm account for 90.0% or more.

* * * * *